Figure 2:
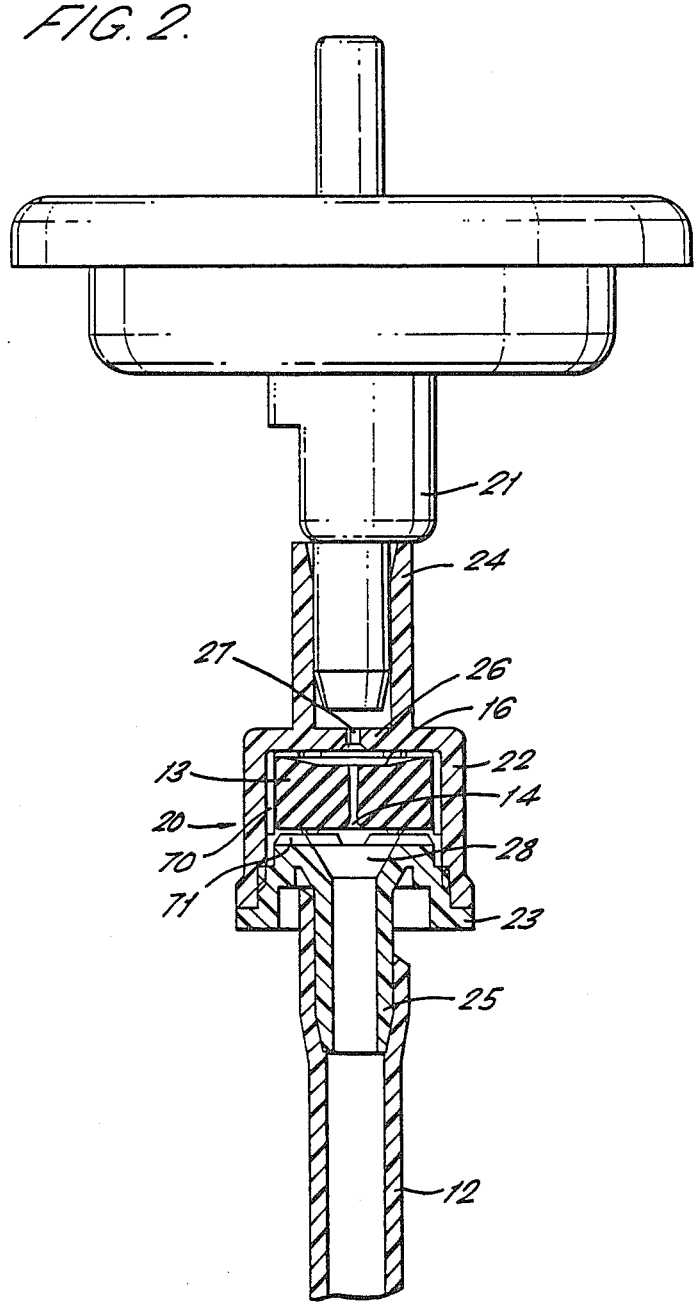

United States Patent [19]

Brace

[11] Patent Number: 4,754,897
[45] Date of Patent: Jul. 5, 1988

[54] GAS PRESSURIZED DISPENSING CONTAINERS

[75] Inventor: Geoffrey Brace, Thetford, England

[73] Assignee: Bespak Plc, Norfolk, England

[21] Appl. No.: 13,573

[22] Filed: Feb. 11, 1987

[30] Foreign Application Priority Data

Feb. 11, 1986 [GB] United Kingdom ............ 8603306
Sep. 26, 1986 [GB] United Kingdom ............ 8623248

[51] Int. Cl.⁴ .................. B65D 82/06; F15D 00/00
[52] U.S. Cl. ............................ 222/402.16; 138/45; 251/120; 239/533.14
[58] Field of Search ............... 137/498, 517, 504; 138/44–45; 239/344, 354, 533.1, 533.13, 533.14; 222/61, 394, 402.1, 402.16, 402.24, 564, 386.5; 251/120

[56] References Cited

U.S. PATENT DOCUMENTS

| Re. 24,534 | 9/1958 | Dahl ........................ 239/533.14 X |
|---|---|---|
| 2,568,519 | 9/1951 | Smith ............................. 138/45 |
| 3,085,720 | 4/1963 | Boch et al. ...................... 222/394 |
| 3,178,076 | 3/1964 | Riedl et al. .................... 222/386.5 |
| 3,545,682 | 12/1970 | Beard ............................ 239/469 |
| 3,586,068 | 6/1971 | Nicholson ....................... 141/20 |
| 3,854,636 | 12/1974 | Conway et al. ................ 222/402.24 |
| 3,942,724 | 3/1976 | Mocarski ........................ 239/417 |
| 3,970,105 | 7/1976 | Pelton et al. .................... 137/498 |
| 4,015,757 | 4/1977 | Meuresch et al. .............. 222/402.16 |
| 4,105,050 | 8/1978 | Hendrickson et al. ............. 138/45 |
| 4,154,378 | 5/1979 | Paoletti et al. .................. 222/394 |
| 4,265,373 | 5/1981 | Stoody ........................... 222/94 |
| 4,401,272 | 8/1983 | Merton et al. .................. 239/337 |
| 4,487,334 | 12/1984 | Werding ......................... 222/55 |
| 4,492,339 | 1/1985 | Kreitzberg ...................... 239/230 |
| 4,650,094 | 3/1987 | Werding ......................... 222/55 |

FOREIGN PATENT DOCUMENTS

| 2370213 | 6/1978 | France . |
|---|---|---|
| 82/00450 | 2/1982 | PCT Int'l Appl. . |
| 84/03456 | 9/1984 | PCT Int'l Appl. . |
| 884608 | 12/1961 | United Kingdom . |
| 1237678 | 6/1971 | United Kingdom . |
| 1514078 | 6/1978 | United Kingdom . |
| 1542849 | 3/1979 | United Kingdom . |
| 2041165 | 9/1980 | United Kingdom . |

Primary Examiner—Michael S. Huppert
Attorney, Agent, or Firm—Beveridge, DeGrandi and Weilacher

[57] ABSTRACT

Dispensing apparatus 1 for a pressurized dispensing container has a valve, a valve actuator and a flow regulator comprising a washer 13 located in a housing 11 such that an aperture 14 of the washer forms a constriction presenting an impedance to the flow. The washer is resiliently deformable to vary the impedance presented by the constriction in response to variation in the pressure differential across the washer such that in use with a pressurized container having a finite resource of pressurizing gas the tendency for the flow rate to decrease with depletion of the gas pressure is compensated by a tendency for the flow rate to increase due to decreased impedance of the flow regulator. The washer has a recessed downstream face 16 which co-operates with a planar seat 15 of the housing such that the washer deforms towards the seat. The apparatus enables containers to be pressurized with nitrogen while maintaining a constant flow rate throughout the dispensing life of the container.

24 Claims, 13 Drawing Sheets

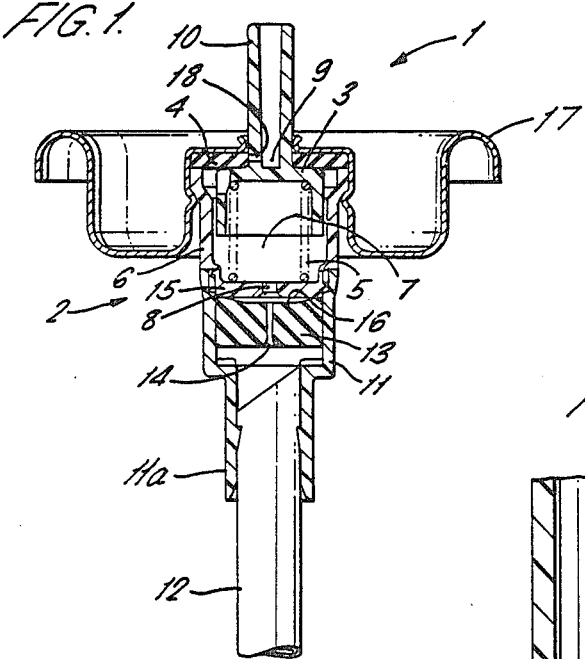
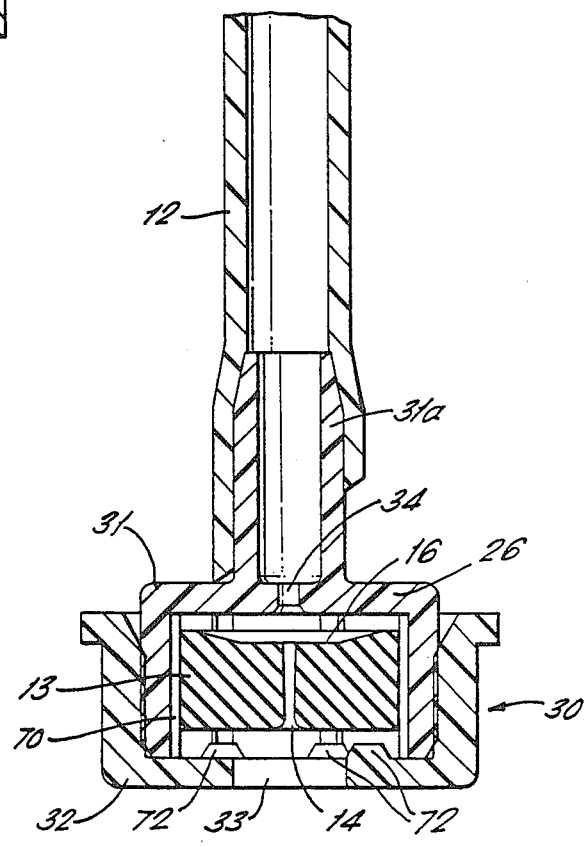

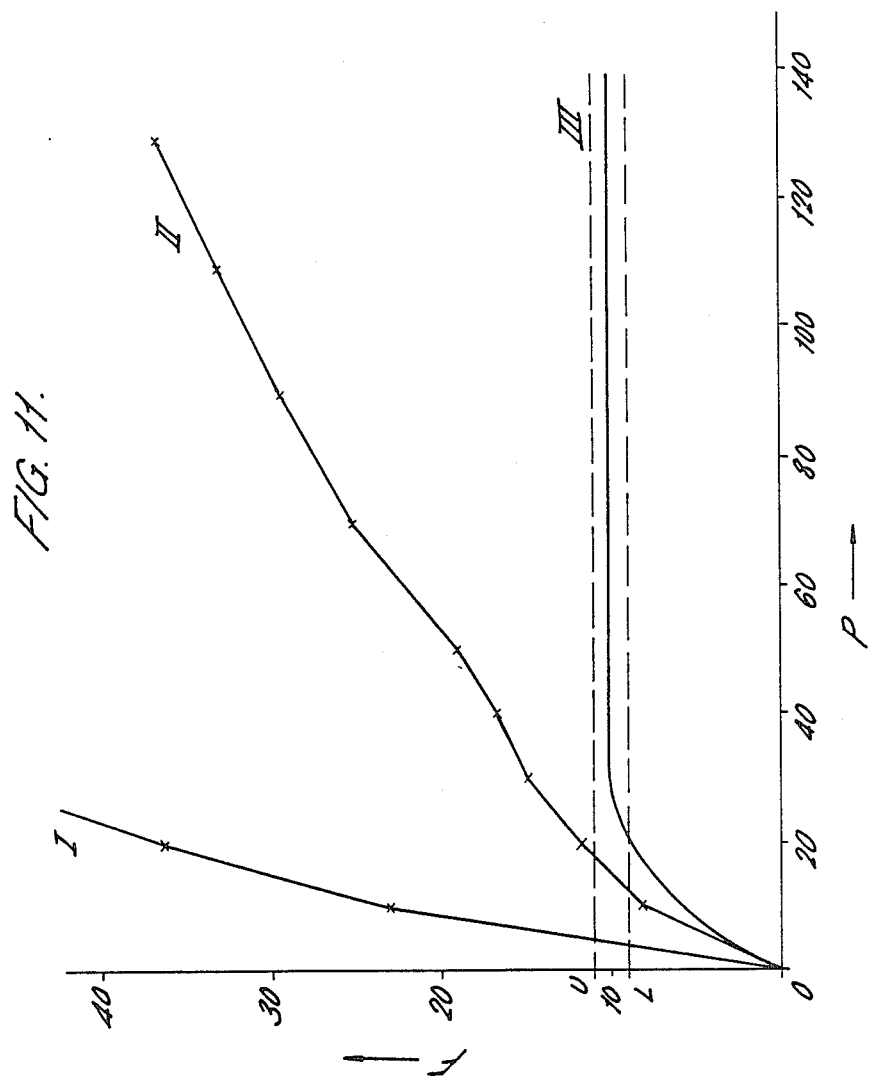

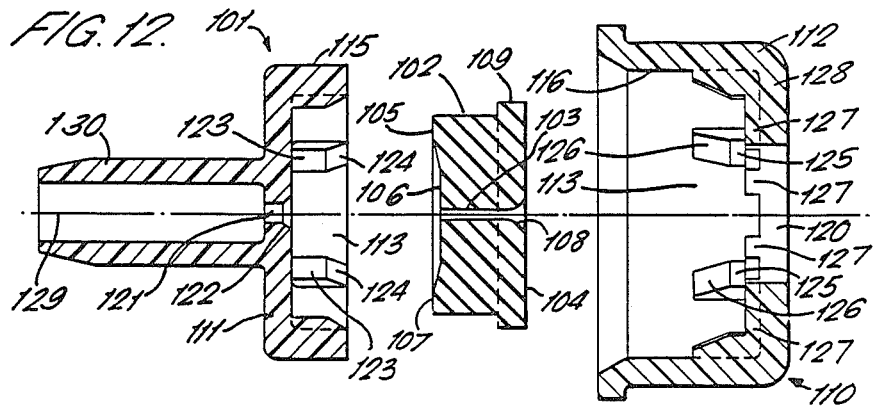
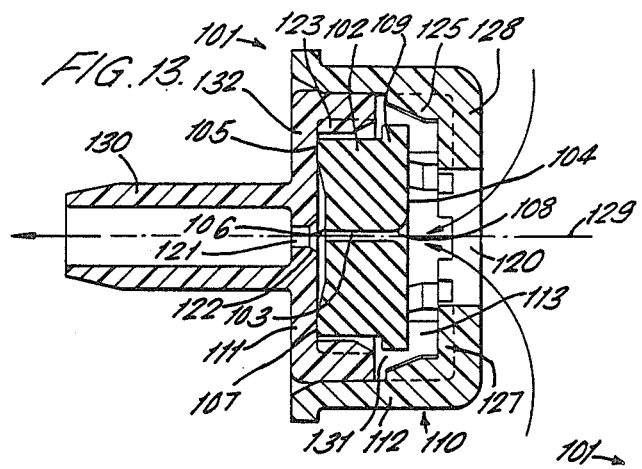
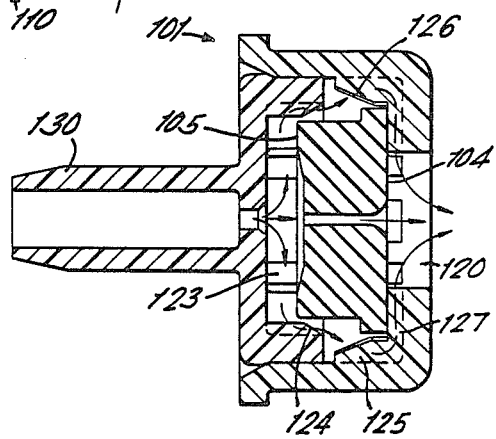
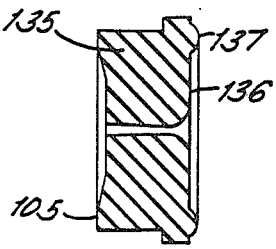

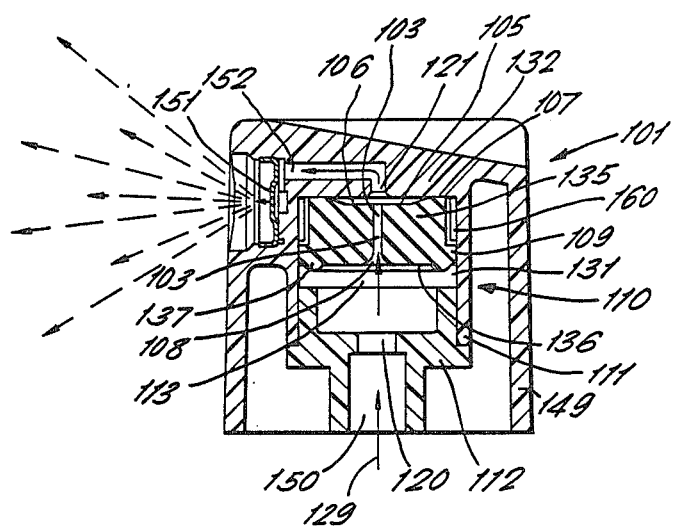

GAS PRESSURIZED DISPENSING CONTAINERS

This invention relates to gas pressurised dispensing containers and in particular to dispensing apparatus for use in such containers.

Pressurised dispensing containers have been used for dispensing a wide variety of products from mobile to viscous liquid products and typically employ a liquid propellent such as a hydrocarbon or fluorocarbon having a sufficiently high vapour pressure at normal working temperatures to propel the product through the dispensing apparatus. The use of such propellants however is known to create environmental and safety hazards and there are inherent disadvantages in using a liquid propellent such as the freezing effect due to varpourisation.

There have recently been therefore attempts to use propellents which are gaseous at normal working temperatures and pressures. Carbon dioxide has been used for example and has the advantage that it is generally highly soluble in the product so that the dissolved gas can be released by shaking the container to counter the effect of depletion of the gas pressure when the product has been partially dispensed. A disadvantage of carbon dioxide as a propellent different formulations of product and also varies with temperature so that care must be taken in filling the container in order to avoid excessive initial gas pressures.

Conventionally use of relatively insoluble propellant gasses such as nitrogen has had the disadvantage that the flow rate of the dispensed product tends to decrease as the gas pressure is depleted during progressive dispensing of the product.

According to the present invention there is disclosed apparatus for a gas pressurized dispensing container comprising a valve, a valve actuator and a flow regulator wherein the flow regulator comprises a housing, a diaphragm located within the housing having an aperture defining a flow path, which aperture forms a constriction presenting an impedence to the flow, and the diaphragm is resiliently deformable to vary the impedence presented by the constriction in response to variation in the pressure differential across the diaphragm such that in use to dispense a product from a container having a finite resource of pressurising gas the tendency for the flow rate to decrease with depletion of the gas pressure is at least partially compensated by a tendency for the flow rate to increase due to decreased impedance of the flow regulator the diaphragm is spaced from the interior walls of the housing in directions which are axial and radial with respect to the direction of fluid flow so as to provide a loose fit of the diaphragm within the housing.

An advantage of such apparatus is that the dispensed flow rate may thereby be controlled to an acceptable level throughout the progressive dispensing of the product from the container.

Preferably the minimum impedance of the regulator is greater than the combined impedance of the remainder of the apparatus. The regulator may thereby dominate the flow characteristic of the apparatus. The minimum impedance referred to here is to be understood to mean the minimum impedance encountered in use which corresponds to the point at which all product is expelled from the pressurised dispensing container.

Preferably a downstream face of the diaphragm co-operates with an annular seat of the housing, one of the face and the seat being recessed and the other being planar and the diaphragm is deformable under sufficient pressure differential into conformal contact between the face and the seat.

Preferably the seat is planar and the downstream face of the diaphragm is recessed.

Preferably the apparatus includes a chamber immediately upstream of the diaphragm such that the flow path is locally enlarged in cross section to expose a substantial part of the upstream face of the diaphragm to flow pressure. The shape of the chamber may be conical, cylindrical or otherwise.

The housing may advantageously be formed integrally with the valve or integrally with the actuator.

Alternatively the housing may be located at the lower end of a dip tube which is immersed in the product.

Alternatively the housing may be located at the lower end of a first portion of a dip tube depending from the valve and having a second portion of the dip tube depending from the regulator housing.

According to another aspect of the invention there is disclosed a pressurised dispensing container including apparatus as hereinbefore disclosed.

According to a further aspect of the present invention there is disclosed a pressurised dispensing container including apparatus as hereinbefore disclosed wherein the container is of the compartmented or multi-compartmented type in which the pressurising gas is separated from the product or products respectively to be dispensed such that any such product is pressurised to the gas pressure but is not mixed therewith.

According to a still further aspect of the invention there is disclosed dispensing apparatus for a gas pressurised dispensing container comprising a valve, a valve actuator and a flow regulator wherein the flow regulator comprises a diaphragm having an aperture defining a flow path, which aperture forms a constriction presenting an impedence to the flow, and the diaphragm is resiliently deformable to vary the impedance of the regulator in response to variation in the pressure differential across the diaphragm such that in use the flow rate varies by not more than 10% for dispensing gas pressures throughout the range 30 to 150 p.s.i.

According to a further aspect of the present invention the apparatus may include the diaphragm which includes an annular flange adjacent its upstream face extending radially with respect to the flow path axis.

An advantage of including such a flange is that an improved flow rate characteristic as a function of pressure is exhibited. The flow rate characteristic as a function of pressure using apparatus in accordance with the present invention typically exhibits an increase form zero of flow rate with increasing pressure until a threshold pressure is reached at pressures beyond which the flow rate becomes substantially constant. The improvement obtained by providing a flange of the diaphragm is to provide a lower threshold pressure as defined above than would be obtained using a corresponding diaphragm which did not include such a flange. This has a practical value since it is an objective in the engineering of such pressurised dispensing containers that the residual container pressure at the point at which the dispensed product is exhausted should be sufficient to maintain the required level of flow rate during discharge so that substantially all of the product may be dispensed. Ideally therefore the residual pressure should be at least equal to the threshold pressure so that the flow rate remains substantially constant throughout the dispensing cycle. The initial pressure to which the container is filled is selected to ensure that the residual pressure is maintained to at least the level of the threshold pressure so that it follows that the use of a flanged diaphragm enables the initial fill pressure to be reduced without loss of performance.

A further advantage of the presence of the flange is that it adapts the diaphragm for automatic component handling systems and semi automatic systems such as those used in shaker board assembly by providing an external feature which may readily be sensed to distinguish the upstream/downstream orientation of the diaphragm.

Preferably a container as hereinbefore disclosed includes a pressurising gas which is nitrogen.

Figure 4:
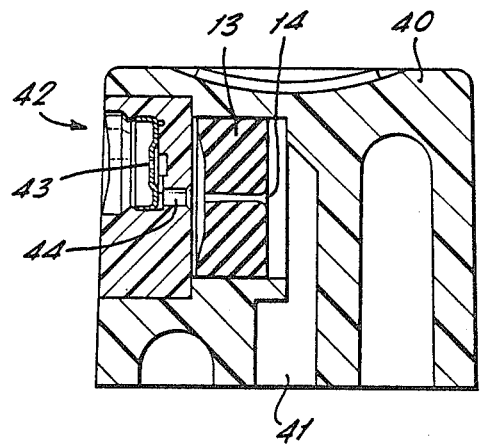
Figure 5:
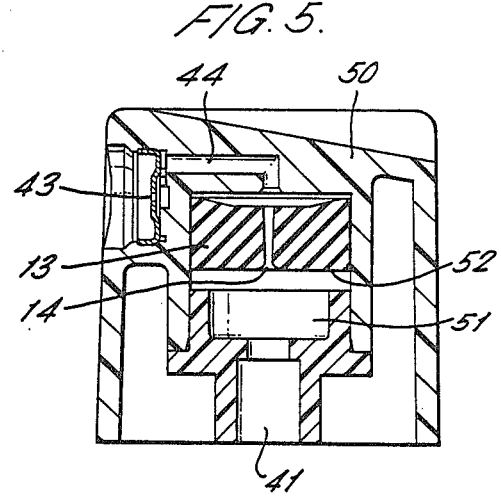
Figure 6:
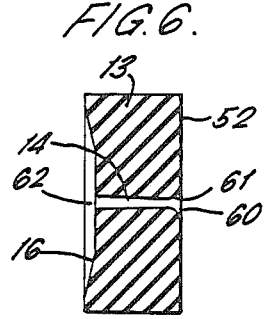
Figure 7:
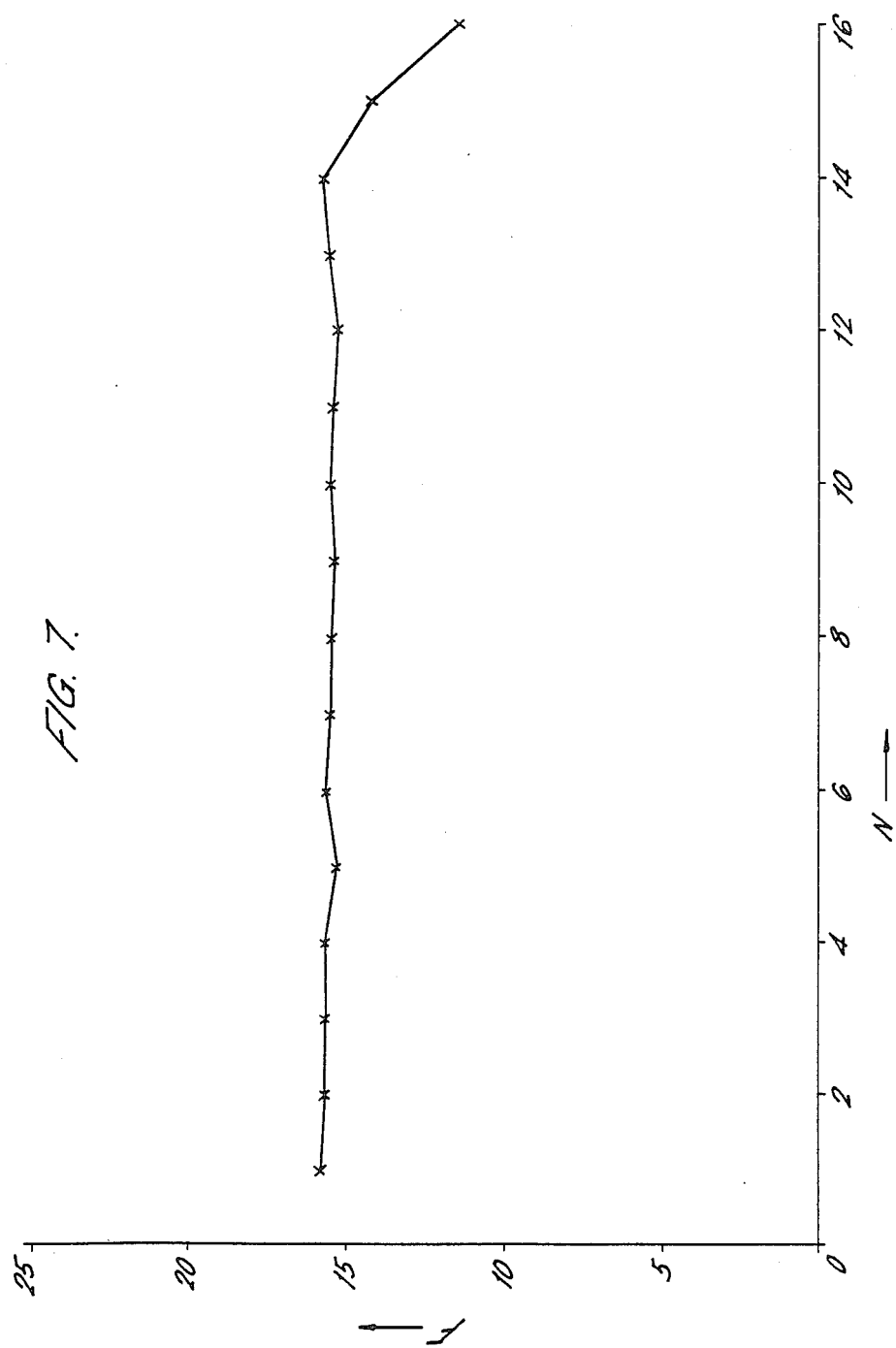
Figure 8:
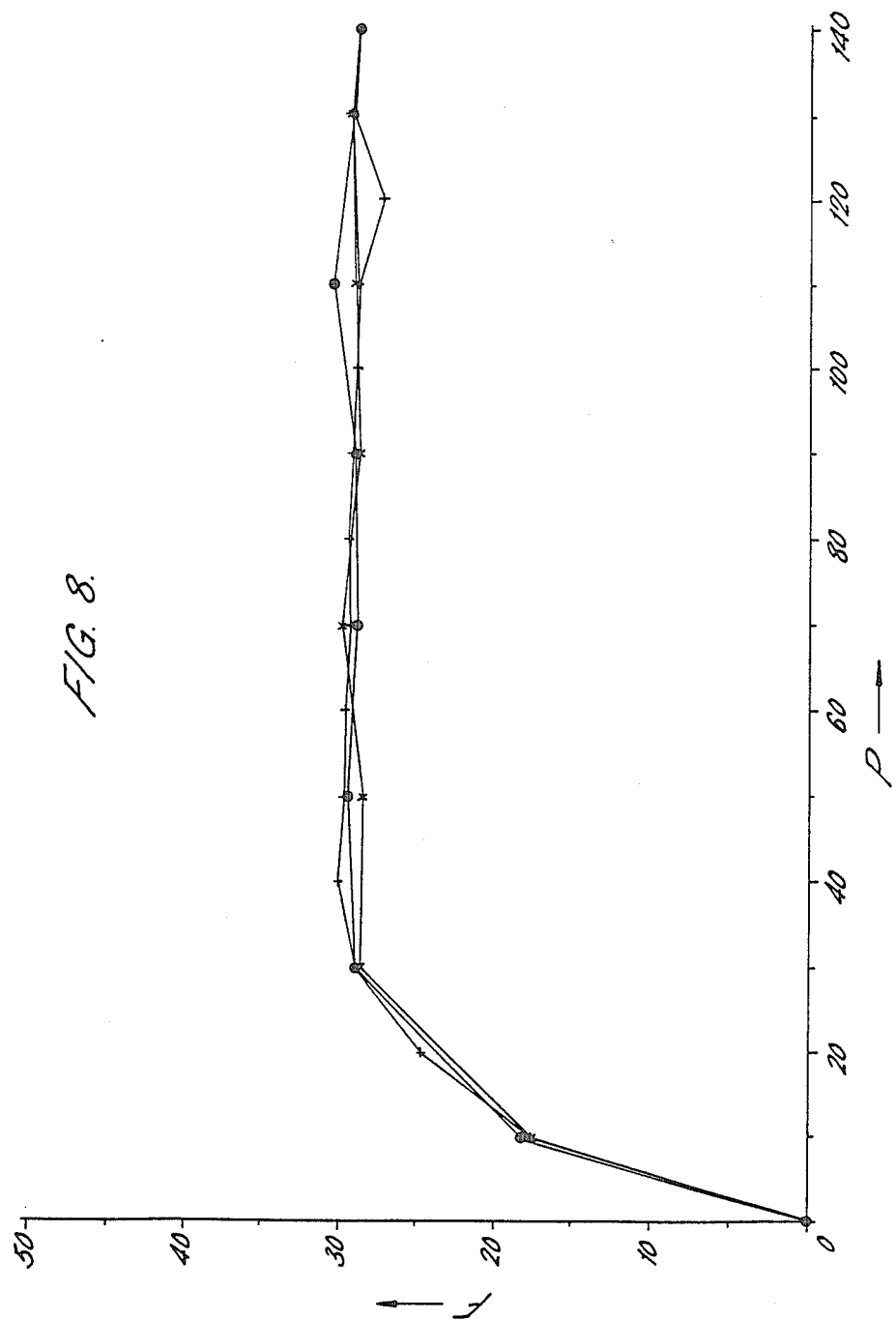
Figure 9:
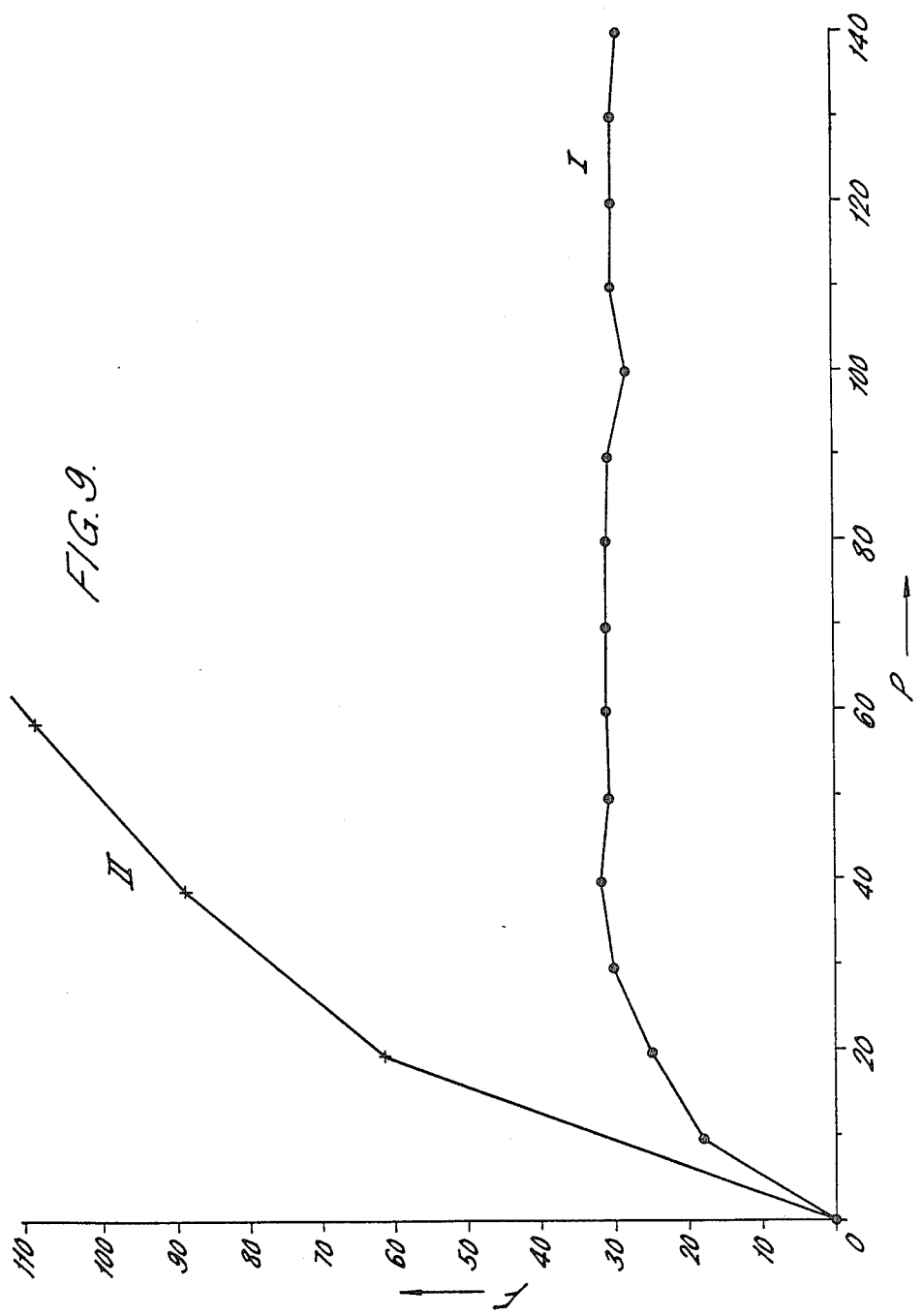
Figure 10:
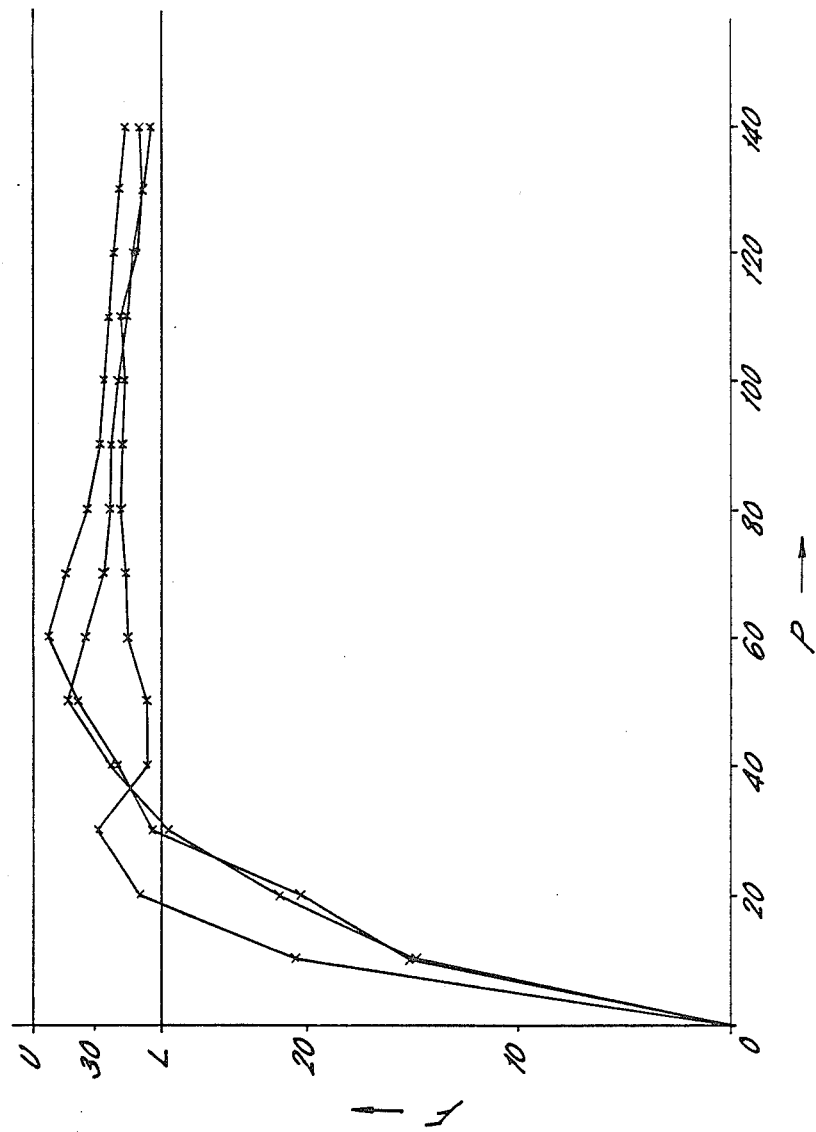
Figure 16:
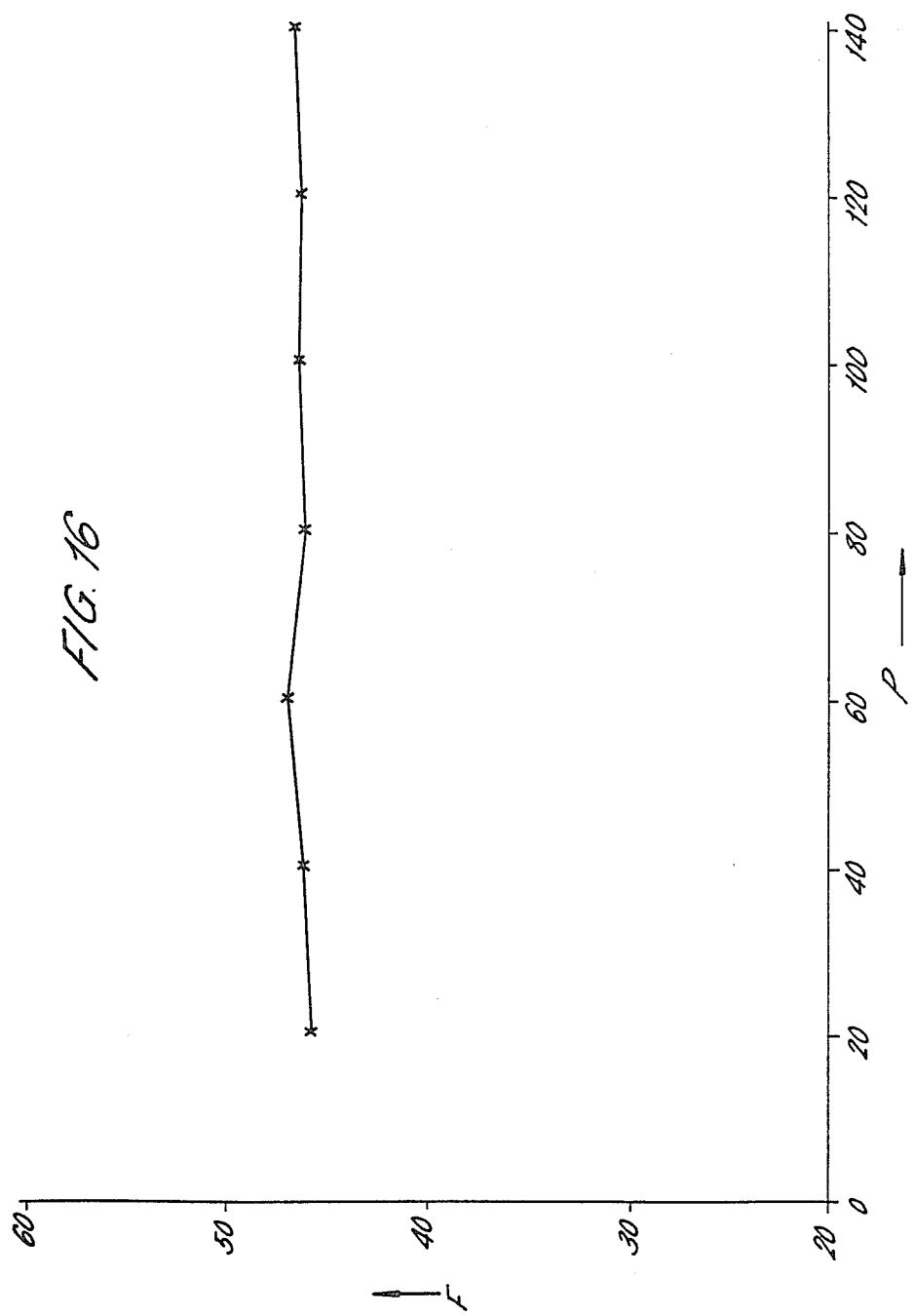
Figure 17:
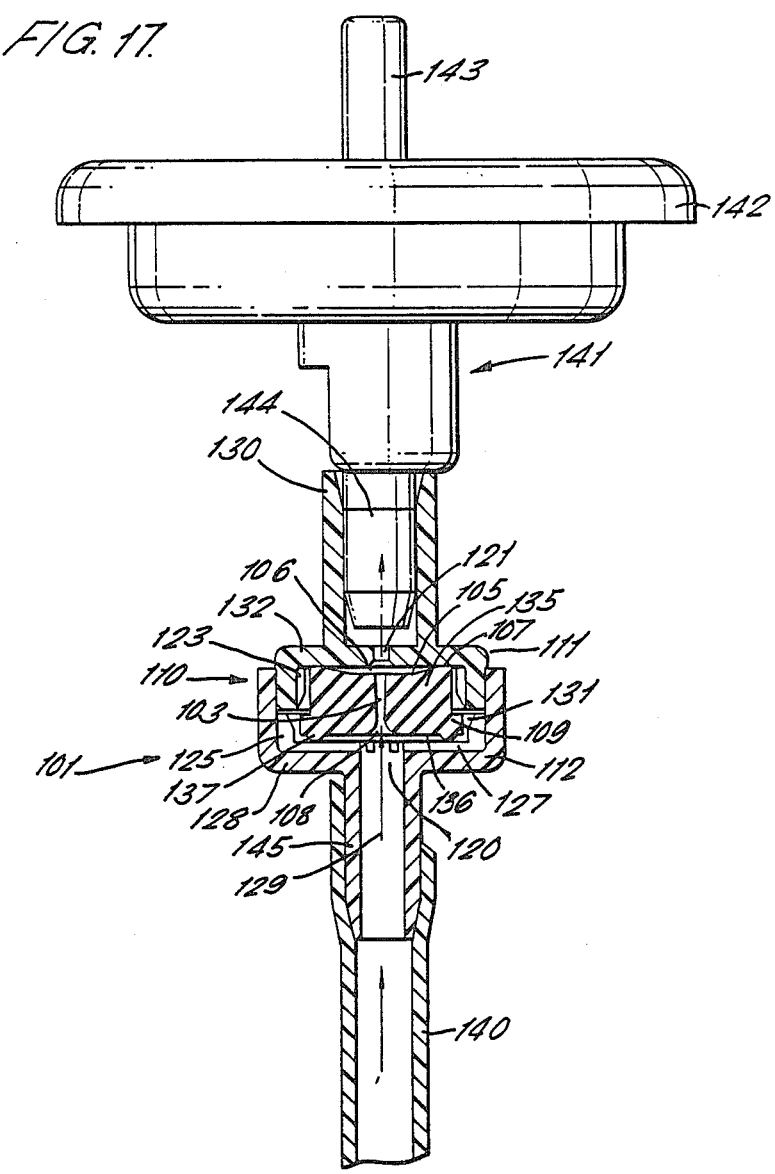
Figure 18:
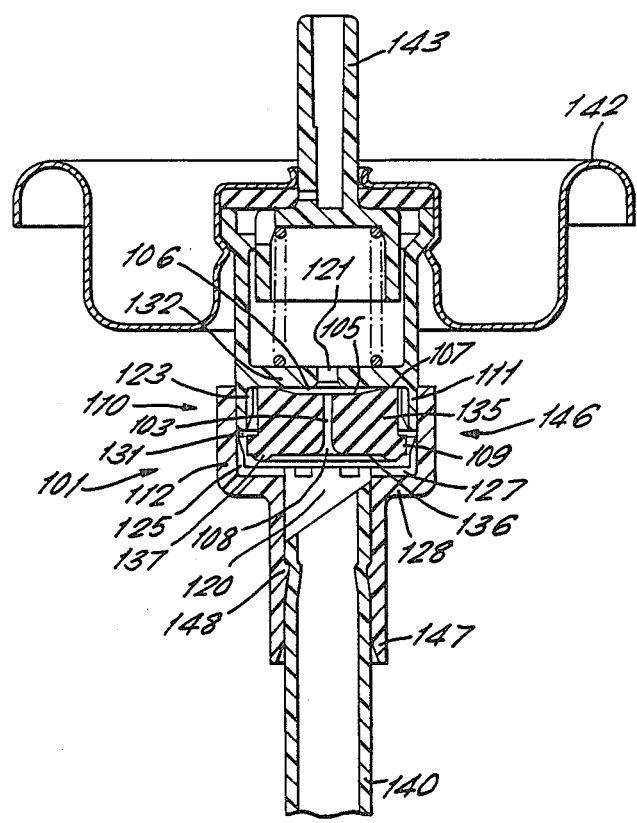

Particular embodiments of the invention will now be described by way of example only and with reference to the accompanying drawings of which FIG. 1 shows a sectional view of apparatus wherein the regulator is housed integrally with the valve, FIG. 2 shows a similar view of an alternative apparatus having a regulator housed separately from the valve and having a housing connected between the valve and a dip tube, FIG. 3 is a sectional view of a regulator separately housed at the lower end of a dip tube, FIG. 4 is a sectional view of a regulator housed integrally with an actuator, FIG. 5 is a sectional view of an alternative actuator housing a regulator, FIG. 6 is a sectional view of a flow regulator diaphragm, FIG. 7 is a graph showing laboratory results of flow rate F against the number of consecutive actuations N using apparatus as shown in FIG. 1 to dispense a product from a pressurised container, FIG. 8 is a graph showing laboratory results of flow rate F against gas pressure using apparatus as shown in FIG. 2, FIG. 9 is a similar graph in which results I were obtained using the apparatus as shown in FIG. 3 and results II were obtained without the regulator, FIG. 10 is a similar graph of results obtained using the apparatus of FIG. 4 and using three alternative types of valve actuator, FIG. 11 is a similar graph showing typical results of I using a valve without a regulator, II using a similar valve fitted with an actuator and III using a valve and actuator fitted with a regulator, FIG. 12 is an exploded sectional view of an alternative flow regulator in which the diaphragm includes an annular flange, FIG. 13 is a sectional assembled view of the flow regulator of FIG. 12 during discharge of a product, FIG. 14 is a similar view of the flow regulator of FIG. 13 during filling of the container, FIG. 15 is a sectional view of a further alternative diaphragm for use in a flow regulator and including an axial projection on its upstream face, FIG. 16 is a graph of flow rate against pressure for a flow of product from a pressurised dispensing container having a flow regulator as shown in FIGS. 12, 13 and 14, FIG. 17 is a sectional view of a further alternative flow regulator with a flanged diaphragm and having a housing connected between a valve and a dip tube, FIG. 18 is a similar view of a further alternative arrangement in which the flow regulator includes a flanged diaphragm and is housed integrally with a valve, and FIG. 19 is a further alternative arrangement in which a flow regulator includes a flanged diaphragm and is housed integrally with a valve actuator.

The apparatus 1 of FIG. 1 has a valve 2 shown in the closed position in which a valve member 3 is held in positive contact with a seal 4 by a return spring 5. A valve housing 6 defines a valve chamber 7 into which product to be dispensed is admitted through a valve inlet 8.

A valve outlet 9 comprises a cylindrical bore through a stem 10 formed integrally with the valve member 3 and connected to an actuator (not shown).

The valve housing 6 includes a tubular lower portion 11 with a tubular extension 11a of reduced diameter which receives a dip tube 12.

A flow regulator comprising a diaphragm in the form of a washer 13 is located within the lower portion 11 of the valve housing and includes an aperture 14 which is aligned with the valve inlet 8.

An annular seat 15 of the valve housing 6 is formed around the inlet 8 and a recessed face 16 of the washer 13 maintains peripheral contact with the seat as shown in the drawing when the valve is in the open position.

The apparatus 1 is fitted to a valve cup 17 which is crimped in known manner to a container (not shown) in which a product to be dispensed is pressurised in this example by nitrogen. The seal 4 is trapped between the upper annular edge of the housing 6 and the valve cup 17.

In use, to dispense the product from the container, the valve stem 10 is depressed against the bias of the return spring 5 so that the valve member 3 moves downward and out of contact with the seal 4. A radial duct 18 in the stem then is able to communicate with the valve chamber 7 so that a flow path is established from the container through the aperture 14, the valve inlet 8, the chamber 7, the radial port 18 and finally into the valve outlet 9 after which the product is dispensed through the stem 10.

The washer 13 is free to move to a limited extent in an axial direction within the tubular lower portion 11 of the housing and when the valve 2 is open the washer is moved by the flow into sealing contact with the seat 15 such that all of the flow must pass through the aperture 14.

The flow path is constricted by the aperture 14 which presents an impedance to the flow which is greater than the combined impedance of the remainder of the apparatus. A pressure differential is established across the diaphragm which is resiliently deformed such that the recessed face 16 is moved into contact with the seat 15 and this deformation further constricts the flow by reducing the aperture 14 so as to increase the impedance of the regulator.

As the product is progressively dispensed from the container the volume of the remaining product will fall and correspondingly the volume of the nitrogen will increase so that the pressure within the container will fall. For a non compartmented container there may be also some loss of nitrogen which may be dispensed with the product, this being the nitrogen which is dissolved in solution.

As the pressure falls the flow rate will tend to decrease but this tendency will be compensated at least partially by the flow regulator since the diaphragm 13 will deform less in response to a reduced pressure differential across it so that the impedance of the regulator will tend to decrease.

It has been found that by suitable choice of flow regulator diaphragm characteristics the flow rate throughout a range of gas pressures may be maintained at a substantially constant level or at least constrained within acceptable tolerances. Experiments with the above disclosed apparatus have produced variations in flow rates of less than 10% for dispensing gas pressures throughout the range 30 to 150 p.s.i.

FIG. 2 shows an alternative apparatus in which the regulator comprises a diaphragm in the form of a washer 13 located in a housing 20 connected between a valve 21 and a dip tube 12. The housing 20 comprises interfitting upper and lower portions 22 and 23 respectively, the upper portion having a push-fit connector 24 for connection with the valve 21. The lower portion 23 of the housing has a further push-fit connector 25 for connection with the dip tube.

The washer 13 is enclosed within the interfitting housing portions 22 and 23 with its downstream face 16 peripherally engageable with a planar seat 26 having a central outlet 27. The washer has a central aperture 14 in line with the outlet 27 and the downstream face 16 is recessed.

The lower housing portion 23 includes a funnel portion 28 which diverges in the direction of flow.

The upper housing portion 22 includes six axially extending ribs 70 which project radially inwardly into loose contact with the washer 13 such that axially extending by-pass channels are formed between the ribs. Radially extending ribs 71 project inwardly from the lower housing portion 23 to define radially extending channels therebetween which communicate between the funnel portion 28 and the channels defined by the axially extending ribs 70.

In use when the valve is opened a flow is established through the dip tube 12, the connector 25, the funnel portion 28, the aperture 14, the outlet 27 and into the valve 21. The washer 13 is a loose fit within the housing to a limited extent but the commencement of flow moves the washer axially into sealing contact with the seat 26 so that all of the flow must pass through the aperture 14. The constriction formed by the aperture 14 of the washer 13 presents an impedance to the flow resulting in a pressure differential across the washer so that the washer will be deformed in the direction of flow to an extent dependent upon the dispensing gas pressure. Under sufficient deformation the downstream face 16 of the washer 13 will become co-planar with the seat 26 and in this condition the aperture 14 will be constricted to present an increased impedance to the flow. At lesser gas pressures the washer will deform to a lesser extent and will therefore present a reduced impedance to the flow.

The apparatus of FIG. 2 is also adapted to enable a container to be charged with pressurising gas through the valve 21, the regulator 20 and dip tube 12. A reversed flow path is then adopted by the filling gas which urges the washer 13 away from the seat 26 into contact with the radial ribs 71. The impedance of the regulator to the reverse flow during this gassing process is reduced by the presence of the channels defined between the ribs 70 and 71 which permit a flow of gas around the exterior of the washer 13 in addition to the flow path provided by the aperture 14. The provision of such by-pass means for reverse flow of gas enables the time taken for gassing to be kept to a minimum.

The further alternative apparatus of FIG. 3 includes a flow regulator comprising a washer 13 housed at the lower end of a dip tube 12 in a housing 30 having a tubular upper portion 31 with a tubular extension 31a of reduced diameter which is a push-fit within the dip tube. A tubular lower portion 32 of the housing is an interference fit with the upper portion 31 and includes an inlet 33.

The upper portion 31 includes an outlet 34 and the washer 13 is disposed co-axially within the housing such that the aperture 14 is aligned with the outlet and inlet 33.

Axially extending ribs 70 are provided to define axially extending channels between the washer 13 and the upper portion 31 and a number of studs 72 project inwardly from the lower portion 32 around the inlet 30 so as to maintain clearance between the washer 13 and the lower portion. The washer 13 is shown in FIG. 3 (and likewise in FIG. 2) at an intermediate position between the axial extremities of its permitted movement. During normal flow when the valve is open the washer 13 moves upwardly with the flow into peripheral sealing contact with the seat 26 so hat all of the flow is constrained to pass through the aperture 14. During gassing of the container a reverse flow of gas pushes the washer downwards into contact with the studs 72 and the impedance of the regulator is decreased by the presence of by-pass channels around the periphery of the washer and between the ribs 70 and studs 72.

FIG. 4 shows an actuator 40 for use in apparatus according the present invention and having a bore 41 for receiving a cylindrical valve stem (not shown), such a stem being arranged to actuate a valve upon depression of the actuator.

The actuator 40 includes a nozzle 42 having an outlet port 43, the nozzle being arranged to subject a flow of product to shear forces in order to generate a mist of the dispensed product. Should a jet of product be required the nozzle may be so arranged as to achieve this.

The washer 13 extends vertically within the actuator so that an aperture 14 communicates horizontally between the bore 41 and a duct 44 communicating from the aperture 14 to the nozzle 42.

FIG. 5 shows a similar actuator 50 in which the washer 13 is disposed horizontally. The actuator 50 includes a funnel portion 51 communicating from a bore 41 to the aperture 14 of the washer such that the upstream face of the washer 52 is fully exposed to the flow.

In FIG. 6 a washer is shown in which the aperture 14 has been enlarged for clarity. The inlet opening 60 has profiled edges 61 and the aperture 14 gradually diverges from the inlet to the outlet 62. The downstream face 16 is recessed.

The results of experiments to determine the flow characteristics obtained using apparatus in accordance with the present invention are shown in FIGS. 7 to 11.

FIG. 7 gives the result of an experiment in which a gas pressurised dispensing container was discharged by means of apparatus as shown in FIG. 1. The valve was actuated for consecutive periods of 15 seconds and the flow rate for each period measured. The graph shows the flow rate F in grams per 15 seconds against the number in sequence of actuations N. The flow rate F is seen to remain approximately constant throughout the first 14 actuations and then decreases rapidly as the product is exhausted.

FIG. 8 shows experimental results obtained using apparatus as shown in FIG. 2. The graph shows flow rate F in grams per 30 seconds against gas pressure P in pounds per square inch, the results being obtained using a flow of water as the dispensed product at ambient temperature. Three curves are shown each of which corresponds to a set of laboratory data obtained using a different valve. In each case the flow rate increases with gas pressure until a pressure of 30 p.s.i. is reached after which the flow rate remains approximately constant throughout the remainder of the measured pressure range of 140 p.s.i.

FIG. 9 shows a graph of flow rate F in grams per 30 seconds against gas pressure P in p.s.i. The results I were obtained using apparatus as shown in FIG. 3 in which a regulator was housed at the lower end of a dip tube and results II were obtained using similar apparatus but with the regulator removed.

Whereas the results obtained without the regulator show a flow rate which increases with gas pressure the results obtained with the regulator show that the flow rate remains approximately constant at gas pressures above 30 p.s.i., the upper and lower limits of flow rate in the range 30 to 140 p.s.i. of gas pressure being 31.87 and 28.27 grams per 30 seconds respectively.

The flow rate therefore remains within 10% of 30 grams per 30 seconds throughout the pressure range 30 to 140 p.s.i.

These results were similarly obtained using water as the dispensed product.

FIG. 10 shows experimental results obtained using apparatus as shown in FIG. 4 in which a regulator is housed integrally with an actuator. Three sets of results are shown giving the flow rate in grams per 30 seconds against gas pressure in pounds per square inch in which water was dispensed through three different types of actuator nozzle. For gas pressures exceeding 40 p.s.i. the flow rate remains within upper and lower limits U and L of 33 and 27 grams per 30 seconds respectively. The flow rate is therefore maintained within 10% of 30 grams per 30 seconds throughout the pressure range 40 to 140 p.s.i.

FIG. 11 shows typical results obtained with and without a regulator. Curve I shows the flow rate obtained using a valve without a regulator and without an actuator and this curve is seen to rise steeply with increasing pressure. Curve II shows the corresponding flow rate when the valve is fitted with an actuator and in this case the curve rises less steeply corresponding to the increased impedance presented to the flow by the presence of the actuator. The curve III shows the flow rate obtained using a valve and actuator fitted with a regulator, the flow rate being maintained within upper and lower limits U and L for gas pressures exceeding 30 p.s.i.

It is apparent from these results that apparatus in accordance with the present invention may be used to maintain the flow rate obtained from a gas pressurised dispensing container at an approximately constant level throughout the useful working range of dispensing gas pressure.

The dispensing flow rate characteristics can however be further enhanced by the use of a washer having an annular flange adjacent to its upstream face as described below.

In FIG. 12 a flow regulator 101 is shown in exploded view and includes a diaphragm in the form of a profiled washer 102. The washer 102 includes a central aperture 103 communicating between an upstream face 104 and a downstream face 105. A recess 106 is formed centrally in the downstream face 105 and is surrounded by an annular surface portion 107. The aperture 103 has an enlarged throat 108 merging with the upstream face 104 and the aperture thereafter is profiled so as to diverge gradually in the downstream direction.

An annular flange 109 of rectangular cross section is formed integrally with the washer adjacent to the upstream face 104 and forms a radial enlargement of the washer 102.

The profiled washer 102 is locatable within a two part housing 110 comprising an outlet portion 111 and an inlet portion 112 which are push fit engageable to enclose the washer 102 in a chamber 113 which s of generally cylindrical shape.

The inlet portion 112 has an inlet orifice 120 which is several times larger in cross section than the aperture 103 and the outlet portion 111 has an outlet orifice 121 which is marginally of greater cross section than that of the aperture 103 and includes a conical enlargement 122 at its upstream end.

The outlet portion 111 has six ribs 123 which project radially inwardly and extend axially within the chamber 113 and are circumferentially equispaced. The ribs 123 have ramped surfaces 124 at their upstream ends. The inlet portion 112 similarly has six axially extending ribs 125 having ramped surfaces 126 at their downstream ends but which further include radially extending portions 127 at their upstream ends merging with the end wall 128 of the chamber 113.

The outlet portion 111 has a tubular extension 130 for insertion into the lower end of a dip tube (not shown) of a dispersing apparatus for a gas pressurised dispensing container so that in use the housing 110 is immersed in the product to be dispensed.

In FIG. 13 the flow regulator of FIG. 12 is shown in its assembled condition with the outlet portion 111 engaged within the inlet portion 112. The difference in internal diameter between the inlet and outlet portions 111 and 112 results in the chamber 113 being of stepped profile such that a radial enlargement 131 is formed by the inlet portion 112 extending axially only part way into the outlet portion 111. The profiled washer 102 is located within the chamber 113 such that the flange 109 is accommodated by the enlargement 131 so as to provide a generally loose fit between the washer and the housing 110 throughout the axial extent of the washer. The washer 102 is symmetrical about a flow path axis 129 passing through the aperture 103 and the housing 110 is assemblable with the washer so as to provide a linear flow path through the flow regulator 101 along the flow path axis. The flow path axis 129 thereby extends centrally through the inlet orifice 120, the aperture 103 and the outlet orifice 121.

The flow regulator 101 in the arrangement of FIG. 13 is shown during the dispensing of a product and the arrows indicate schematically the flow of product through the regulator under conditions in which a valve (not shown) located downstream of the regulator has been vented to atmosphere. The flow regulator is located within a pressurised dispensing container such that a pressure differential exists across the washer 102 with consequent flow of product. Although shown in the FIG. 13 as being horizontal, the apparatus in use would generally be oriented with the flow path axis 129 vertical with the flow in an upward direction. In this condition the washer 102 is forced by the flow against a planar seat 132 forming the downstream end of the chamber 113 and a seal is formed between the seat 132 and the annular surface portion 107 of the washer. Product flow is therefore constrained to pass within the aperture 103. The situation depicted in FIG. 13 is that of a relative low pressure differential at which the washer 102 is not discernibly deformed but at increased levels of pressure the washer 102 will become resiliently deformed into contact with the seat 132 such that the recess 106 is not longer evident.

The ribs 123 and 125 serve to space the washer 102 clear of the walls of the chamber 113 and the washer is of a sufficiently loose fit to be axially moveable away from contact with the seat 132 under conditions of reversed flow direction due to this relationship and the previously mentioned loose fit throughout the axial extent of the diaphragm, it will be appreciated that the diaphragm is spaced from the interior walls of the housing in directions which are axial and radial with respect to the direction of fluid flow so as to provide a loose fit of the diaphragm within the housing.

In FIG. 14 the flow regulator of FIGS. 12 and 13 is shown under conditions in which the normal flow is reversed as in the case where a dispensing container is being filled by the supply of pressurised gas through the valve, dip tube and into the tubular extension 130 of the outlet portion. In this condition the washer 102 is moved axially into contact with the upstream end of the chamber 113 and in contact with the radially extending portions 127 of the ribs 125. The arrows indicate the filling flor path provided not only through the apertuer 103 but around the circumference of the washer 120 through axially and radially extending channels formed between adjacent ribs 125, 123, to the inlet orifice 120 and thence to the container in which the flow regulator is located.

The ramped surfaces 126 and 124 serve to maintain the attitude of the washer 102 during assembly of the housing 110 and assist in centrally locating the washer during insertion.

In FIG. 15 an alternative form of profiled washer 135 is shown in which the upstream face 136 includes a protrusion comprising an axially extending annular flange 137 of segmental cross section. When the upstream face 136 is presented in abutment with a planar supporting surface the face 136 is spaced from the surface by the flange 137. This is particularly useful during shaker board assembly where the surface contact with a shaker board should preferably be the same for both orientatios of the wahser i.e. upstream face 136 or downstream face 105 facing downwards. When used in a housing 110 as shown in FIGS. 12 to 14 the alternative washer 135 functions in a similar fasion to the washer 102 of FIGS. 12, 13 and 14 with the exception that in the reverse flow filling condition the washer 135 is further spaced from the chamber wall by the presence of the axially extending annular flange 137 in abutment with the radially extending portions 127 of the ribs 125.

The washer 102 in the above embodiment of FIGS. 12, 13 and 14 is of nitrile rubber material. The diameter of the washer 102 is 7.25 mm which is stepped to 8.25 mm by the presence of the flange 109 so that the flange is of 0.5 mm radial thickness. The overall axial dimensions of the washer 102 is 3.45 mm with the flange 109 having an axial extent of 1.0 mm. The recess 106 formed centrally in the downstream face 105 is of 0.35 mm depth, 6.35 mm outer diameter with a planar central portion of 3.25 mm diameter. The aperture 103 has a minimum diameter of 0.275 mm and exhibits a divergence of two degrees in the downstream direction.

The results of laboratory tests to determine the flow characteristics obtained using a flow regulator as shown in FIGS. 12, 13 and 14 are shown graphically in FIG. 16. The Flow rate F in c.c. per minute of water is shown as a function of test pressure P in pounds per square inch. The flow rate is seen to be substantially constant over the range of test pressures from 20 pounds per square inch to 140 pounds per square inch. It is therefore possible to infer a threshold pressure which is not more than 20 pounds per square inch when its flow regulator is used in a pressurised dispensing container. Assuming that the container is initially filled with one third by volume of propellent and two thirds by volume of product then on exhaustion of the product the propellent pressure would be expected to have fallen to one third of its initial value. The initial fill pressure would then need to be three times the expected residual pressure so that inthis instance an initial fill pressure of 60 pounds per square inch would be required.

By comparison, the corresponding results obtained using a flow regulator in which the diaphragm did not include an axially extending annular flange showed a threshold pressure of 30 pounds per squre inch requiring a corresponding initial fill pressure of 90 pounds per square inch. The means flow rate may of course be preselected by selection of an appropriate minimum diameter for the aperture 103.

It is therefore the apparent that a significant reduction in initial fill pressure may be achieved by the use of a flow regulator having a flanged washer.

In an alternative embodiment (not shown) the flange includes one or more peripheral indentations or apertures providing one or more bypass flow paths for use in filling a pressurised dispensing container. This may then obviate the need for internal ribs in the housing.

Flow regulators having flanged washers may be incorporated in dispensing apparatus for use in pressurised dispensing containers in a number of alternative ways as shown in FIGS. 17, 18 and 19 in which figures the flow regulator parts corresponding to those of FIGS. 12, 13 and 14 are indicated by corresponding numerals where appropriate.

In FIG. 17 a flow regulator 101 is housed in line with a dip tube 140 which is connected upstream of the flow regulator and a valve 141 which is downstream of the flow regulator. The valve 141 is mounted in a valve cup 142 suitable for crimping onto a dispensing container and a valve stem 143 extends through the valve cup the arrangement being such that depression of the valve stem actuates the valve thereby establishing a flow path through the dip tube 140, the flow regulator 101, the valve 141 and the hollow valve stem 143 through which the propellent urged product from the pressurised container is dispensed.

The housing 110 in FIG. 17 includes an outlet portion 111 having a tubular extension 130 of reduced diameter which is engaged by a push fit onto a ducted portion 144 of the valve 141. An inlet portion 112 of the housing 110 includes a second tubular extension 145 upon which a dip tube 140 is a push fit. The flow regulator 101 of FIG. 17 includes a profiled washer 135 of the type shown in FIG. 15 which includes an axially extending annular flange 137. The housing 110 includes ribs 123 and 125 providing channels therebetween for use in filling the container by means of a reverse flow of pressurising gas.

FIG. 18 shows an alternative arrangement in which an alternative valve 146 includes a flow regulator 101 housed integrally with the valve. An inlet portion 112 of the housing is a push fit onto an outlet portion 111 which is formed as a lower part of the valve 146. The inlet portion 112 is provided with a tubular extension 147 within which a dip tube 140 is a push fit. The tubular extension 147 includes an inwardly directed gripping rib 148 for retaining the dip tube in position.

FIG. 19 shows an alternative embodiment in which a flow regulator 101 is housed integrally with an actuator 149 for a pressurised dispensing container of the type having a valve actuated by depression of a valve stem through which product is dispensed. The valve actuator 149 has a bore 150 for receiving such a valve stem and communicating with an inlet orifice 120 of the flow regulator. A profiled washer 135 is housed in a chamber 113 formed by an inlet portion 112 which is a push fit within an outlet portion 111 which is integrally formed with the actuator 149.

The actuator 149 includes a nozzle 151 communicating with an outlet orifice 121 of the housing 110 via a channel 152. In use with a pressurised dispensing container (not shown) the actuator 149 is depressed so as to depress the valve stem and actuate the valve. A flow is then established through the valve stem along a flow path axis 129 into the inlet orifice 120, the chamber 113, the aperture 103 of the wahser 135, the outlet orifice 121 and then is deflected through the channel 152 and emitted as a spray from the nozzle 151.

In FIGS. 17, 18 and 19 the washer 135 is shown in a position corresponding to discharge of the product in which the washer is maintained incontact with a seat 132 of the housing 110. The flow regulator of FIG. 19 which is housed in an actuator 149 is not adapted to allow for reverse flow filling since the actuator is generally fitted to the valve stem after filling of the container. The flow regulator 101 of FIG. 19 however does include axially extending ribs 160 which extend axially within the chamber 113 downstream of the flange 109 and these ribs serve only to maintain the washer 102 in its correct axial orientation whilst allowing the washer to be a loose fit within the chamber.

Flow regulators in accordance with the present invention are particularly useful in pressurised dispensing containers in which the propellent is entirely gaseous at normal temperature and pressure such as air, nitrogen, carbon dioxide or nitrous oxide. The normal temperature and pressure referred to above relates to temperatures and pressures normally found in aerosol type pressurised dispensing containers where a maximum pressure of about 150 pounds per square inch is encountered and the temperature is normal room temperature. The pressures referred to throughout the present specification are quoted in psi gauge units i.e. pressure above atmospheric pressure.

What is claimed is:

1. Dispensing apparatus for a gas pressurized dispensing container comprising a valve, a valve actuator and a flow regulator wherein the flow regulator comprises a housing having an inlet and an outlet, a seat in the housing surrounding the outlet, compensation means for decreasing the impedence of the flow regulator in response to decreases in the gas pressure in the container; said compensation means including a diaphragm located within the housing and having at least a downstream face, a peripheral surface portion extending upstream from the downstream face and an aperture defining a flow path, which aperture forms a constriction presenting an impedence to the flow through the regulator, the housing having interior walls which are spaced form the diaphragm in directions which are axial and radial with respect to the flow path so as to provide a loose fit of the diaphragm in the housing, the diaphragm being resiliently deformable to change the geometry of the aperture being operable to vary the impedance presented by the constriction in response to variation in the pressure differential across the diaphragm, the downstream face of the diaphragm cooperating in use with the seat, one of the face and the seat being recessed such that a seal line is formed between the downstream face of the diaphragm and the seat adjacent the peripheral surface portion and wherein the diaphragm is deformable under sufficient pressure differential into conformal contact between the face and the seat, such that in use to dispense a product from a container having a finite resource of pressurising gas the tendency for the flow rate to decrease with depletion of the gas pressure is at least partially compensated by a tendency for the flow rate to increase due to decreased impedance of the flow regulator.

2. Apparatus as claimed in claim 1 wherein the minimum impedance of the regulator is greater than the combined impedance of the remainder of the apparatus.

3. Apparatus as claimed in claim 1 wherein the seat is planar and the downstream face of the diaphragm is recessed.

4. Apparatus as claimed in claim 1 including a chamber immediately upstream of the diaphragm such that the flow path is locally enlarged in cross section to expose a substantial part of the upstream face of the diaphragm to the flow pressure.

5. Apparatus as claimed in claim 1 wherein the housing is formed integrally with the actuator.

6. Apparatus as claimed in claim 1 wherein the housing is formed integrally with the valve.

7. Apparatus as claimed in claim 1 including a dip tube the lower end of which tube in use is immersed in the product to be dispensed and wherein the housing is located at the lower end of the dip tube.

8. Apparatus as claimed in claim 1 including a dip tube having a first portion depending from the valve with the housign located at the lower end thereof and a second portion depending from the housing which portion in use is immersed in the product to be dispensed.

9. Apparatus as claimed in claim 1 wherein the diaphragm includes an annular flange adjacent its upstream face extending radially with respect to the flow path axis.

10. Apparatus as claimed in claim 9 wherein the diaphragm has an upstream face having a planar portion and includes an axially extending protrusion such that when the upstream face of the diaphragm is presented in abutment with a planar supporting surface the planar portion is spaced therefrom.

11. Apparatus as claimed in claim 10 wherein the protrusion is an annular flange.

12. Apparatus as claimed in claim 11 wherein the downstream face of the undeformed diaphragm has a recess such that when the downstream face of the diaphragm is presented in abutment with a planar supporting surface an annular surface portion of the downstream face is in contact with the supporting surface and wherein the area of contact between the diaphragm and the supporting surface is substantially the same whether the upstream or downstream face is so presented.

13. Apparatus as claimed in claim 9 wherein the housing includes a radially extending annular recess for accommodating the annular flange of the diaphragm.

14. Apparatus as claimed in claim 9 wherein the diaphragm includes a downstream face having an annular surface portion and the housing includes a co-operating annular seat, the flow path axis extending through both the annular surface portion and the seat, whereby the diaphragm is urged into sealing engagement with the seat of the housing when a flow is established such that the flow passes solely through the aperture of the diaphragm.

15. Apparatus as claimed in claim 1 wherein the housing includes bypass means for allowing the flow to bypass the diaphragm when the direction of flow is reversed during filling of the container.

16. Dispensing apparatus as claimed in claim 15 wherein the bypass means comprises axially extending channels between the radially outer surface of the diaphragm and the housing.

17. Dispensing apparatus as claimed in claim 16 wherein the or at least one of the channels is formed between axially extending ribs projecting inwardly from the housing.

18. Dispensing apparatus as claimed in claim 17 wherein the diaphragm includes an annular flange adjacent its upstream face extending radially with respect to the flow path axis, and wherein at least one of the channels is provided by an indentation in the flange of the diaphragm.

19. A pressurised dispensing container including apparatus as claimed in claim 1.

20. A pressurised dispensing container including apparatus as claimed in claim 1 wherein the container is of the compartmented or multi-compartmented type in which the pressurising gas is separated from the product or products respectively to be dispensed such that any such product is pressurised to the gas pressure but is not mixed therewith.

21. A dispenser as claimed in claim 19 wherein the gas is nitrogen.

22. Dispensing apparatus for a gas pressurized dispensing container comprising a valve, a valve actuator and a flow regulator wherein the flow regulator has a housing having an inlet and an outlet, a seat in the housing surrounding the outlet, compensation means for decreasing the impedance of the flow regulator in response to decreases in the gas pressure in the container; said compensation means including a resiliently deformable diaphragm located within the housing, the diaphragm having an aperture defining a flow path, which aperture forms a constriction presention an impedance to the flow, the diaphragm having at least a downstream face and a peripheral surface portion which extends upstream from the downstream face, the housing having interior walls which are spaced from the diaphragm in directions which are axial and radial with respect to the flow path so as to provide a loose fit of the diaphragm in the housing to change the geometry of the aperture to an extent which s dependent on the pressure differential across the diaphragm, said change in geometry of the aperture being operable to vary the impedance of the regulator in response to variation in the pressure differential across the diaphragm such that in use the flow rate varies by not more than 10% for dispensing face of the through the range 30 to 150 psi., the downstream face of the diaphragm cooperating in use with the seat, one of the face and the seat being recessed such that a seal line is formed between the downstream face of the diaphragm and the seat adjacent the peripheral surface portion and wherein the diaphragm is deformable under sufficient pressure differential into conformal contact between the face and the seat.

23. Apparatus as claimed in claim 22 wherein the diaphragm further comprises a generally planar upstream face, the peripheral surface portion being cylindrical and extending between said upstream and downstream faces.

24. Apparatus as claimed in claim 1 wherein the diaphragm further comprises a generally planar upstream face, the peripheral surface portion being cylindrical and extending between said upstream and downstream faces.

* * * * *

UNITED STATES PATENT AND TRADEMARK OFFICE
CERTIFICATE OF CORRECTION

PATENT NO. : 4,754,897
DATED : July 5, 1988
INVENTOR(S) : Geoffrey BRACE

It is certified that error appears in the above—identified patent and that said Letters Patent is hereby corrected as shown below:

Column 1, line 26 - after "propellent" insert
   -- however is that its solubility is variable with --.

Column 1, line 50, "regulator the" should read
        -- regulator. The --.

Column 6, line 26, "hat" should read -- that --.
Column 8, line 18, "s" should read -- is --.
Column 9, line 13, "not" should read -- no --.
Column 9, line 34, "flor" should read -- flow --.
Column 9, line 34, "apertuer" should read -- aperture --.
Column 9, line 35, "120" should read -- 102 --.
Column 9, line 53, "orientatios of the wahser" should read
      -- orientations of the washer --.

Column 10, line 30, "means" should read -- mean --.
Column 11, line 31, "wahser" should read -- washer --.
Column 12, line 6, "form" should read -- from --.
Column 12, line 11, after "aperture" insert
    -- to an extent which is dependent on the pressure
    differential across the diaphragm, said change in
    geometry of the aperture --.
Column 14, line 21, "s" should read -- is --.
Column 14, line 27, "face of the" should read
    -- gas pressures --.

UNITED STATES PATENT AND TRADEMARK OFFICE
CERTIFICATE OF CORRECTION

PATENT NO.  : 4,754,897
DATED       : July 5, 1988
INVENTOR(S) : Geoffrey Brace

Page 2 of 2

It is certified that error appears in the above-identified patent and that said Letters Patent is hereby corrected as shown below:

```
Column 14, line 13, "presention" should read
-- presenting --.
```

Signed and Sealed this

Twenty-first Day of November, 1989

Attest:

JEFFREY M. SAMUELS

*Attesting Officer*   *Acting Commissioner of Patents and Trademarks*